Sept. 18, 1923.　　　　　　　　　　　　　　1,468,307
G. C. MARX
ELECTRIC MOTOR
Original Filed Aug. 24, 1917　　2 Sheets-Sheet 1

Sept. 18, 1923.  1,468,307
G. C. MARX
ELECTRIC MOTOR
Original Filed Aug. 24, 1917   2 Sheets-Sheet 2
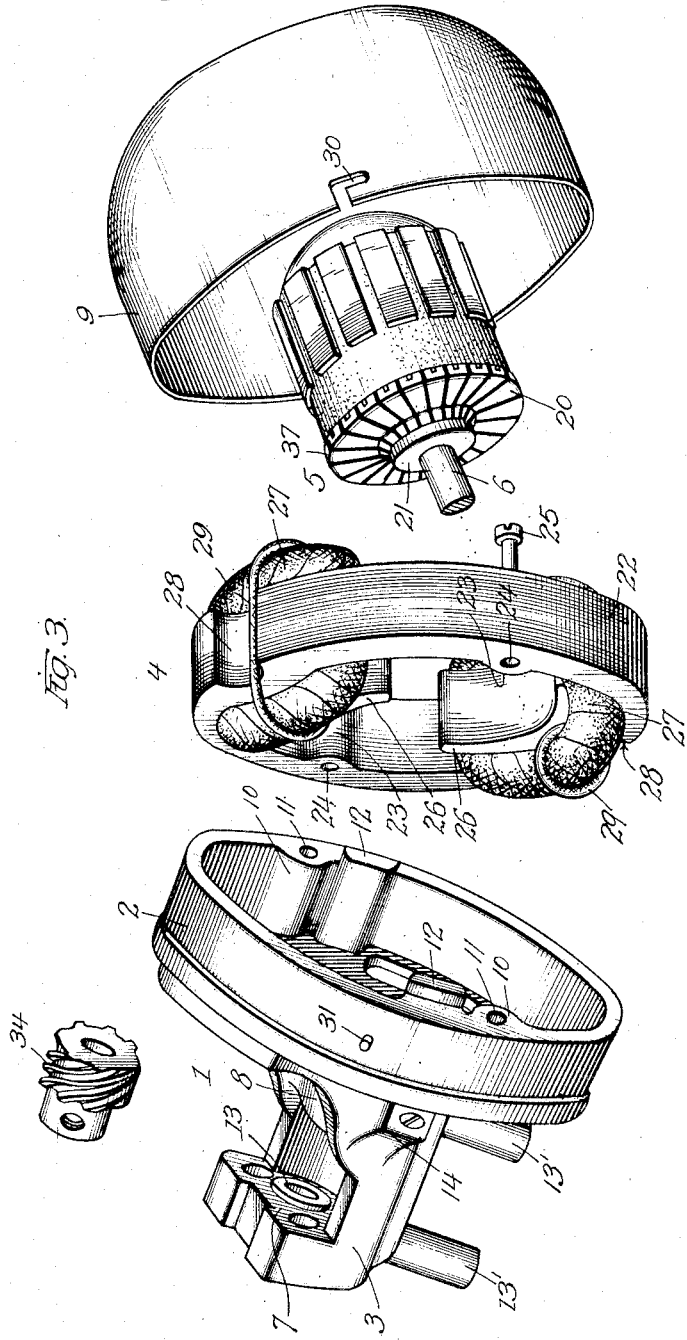

Patented Sept. 18, 1923.

1,468,307

UNITED STATES PATENT OFFICE.

GUSTAVE C. MARX, OF ELIZABETH, NEW JERSEY, ASSIGNOR TO DIEHL MANUFACTURING CO., OF ELIZABETH, NEW JERSEY, A CORPORATION OF NEW JERSEY.

ELECTRIC MOTOR.

Application filed August 24, 1917, Serial No. 187,969. Renewed September 29, 1922. Serial No. 591,399.

*To all whom it may concern:*

Be it known that I, GUSTAVE C. MARX, a citizen of the United States, residing at Elizabeth, in the county of Union and State of New Jersey, have invented new and useful Improvements in Electric Motors, of which the following is a specification.

This invention relates to electric motors.

Electric motors are often mounted directly upon the frame of the machine which is to be driven by the motor. For instance it has been proposed to mount a sewing machine motor directly upon the standard of the sewing machine. In such cases it is important that the motor be so constructed and so associated with the frame of the machine to be driven that it will project but a small distance from the frame. In other words, the motor should have but a small overhang. The motor should also be compact and simple in construction.

One object of this invention is to provide an improved electric motor which is simple and compact in construction.

Another object is to provide a motor which will project only a small distance from the frame of the machine to which the motor is attached.

Another object is to provide an electric motor whose armature is supported at one end only.

Another object is to provide an electric motor whose field structure may be applied to the bearing frame as a unit.

Other objects will appear as the specification proceeds.

The invention is illustrated in the accompanying drawings, in which—

Figure 3 is a perspective view showing the motor disassembled in order to make clear the construction of each part.

Figure 1:
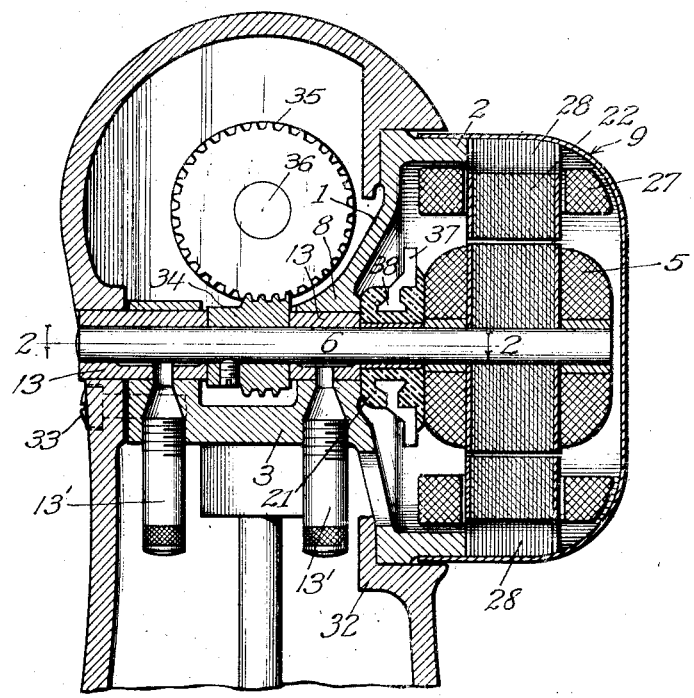
Figure 1 is a transverse section through a portion of a sewing machine frame showing the improved motor associated therewith.

The motor comprises in general a frame which supports the field core and windings. This frame houses the bearings in which the armature shaft is journaled, both of the bearings being located at one side of the motor. When the motor is supported on the frame of the machine to be driven, that side of the motor frame having the bearings is inserted in the frame of the driven machine causing the motor to project only a small distance from the frame of the driven machine. This is due to the fact that at the outer side of the motor there is no bearing for the armature shaft and therefore the overhang of the motor is reduced. This compactness which lessens the overhang of the motor is further increased by employing a disc commutator located at the journaled end of the armature. The commutator cooperates with brushes housed within the bearing frame at points adjacent to the lateral face of the commutator. A cover incloses the outer side of the motor and causes the motor to present a neat appearance, and also causes the external lines of the motor to be in symmetry with the lines of the frame of the driven machine.

In the drawings, the frame of the motor is shown at 1. It comprises a hollow cylindrical portion 2 and a rearwardly extending bearing portion 3. The field structure which is denoted generally by the reference character 4 (Fig. 3) is adapted to be secured to the outer edge of the cylindrical part 2 of the frame 1. The armature 5 is adapted to be positioned in coaxial relation with the frame 2 and field structure 4, and the shaft 6 of the armature is adapted to be rotatably supported in the bearing boxes 7 and 8 of the frame 1.

A cover 9 telescopes over the field structure 4 and the cylindrical portion 2 of the frame 1, thereby enclosing the interior parts of the motor.

More specifically considered the different parts of the motor are constructed as follows:—

The body of the frame 1 may be cast in one piece. It is so cast that the inner surface of the cylindrical portion 2 is provided with bosses 10 in which are drilled the bolt holes 11 that receive the bolts for fastening the field structure to the part 2. Suitable lugs or projections 12, formed on the part 2, serve as guides to properly position the field structure in true coaxial relation with the part 2.

The bearing boxes 7 and 8 are provided with bushings 13 in which the shaft of the armature is journaled. Oil cups 13' may be provided for supplying lubricant to the armature shaft at the points where it is journaled in the bushings 13.

Figure 2:
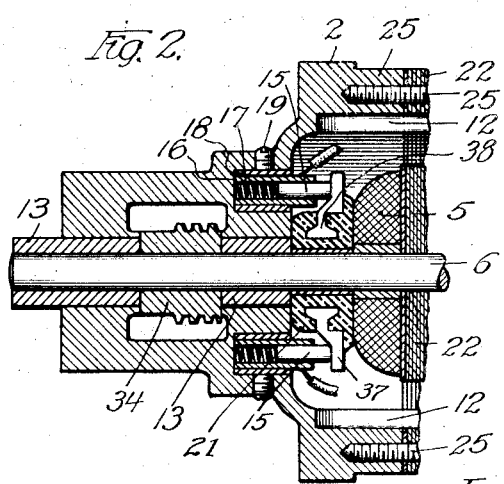
Figure 2 is a horizontal section of a portion of the motor taken on the axis of the motor armature.

A projection 14 is formed at each side of the part 3 of the frame 1 and in each of these projections is housed one of the brush supports. The brushes are shown at 15 in Figure 2 and may be a cylindrical piece of carbon. Each brush is mounted in a metallic sleeve 16 so that it can slide longitudinally in the sleeve. A coil spring 17 yieldingly urges the brush outwardly. The metallic sleeve 16 may be insulated from the frame by an insulting bushing 18, and the entire brush structure may be clamped in the projection or boss 14 by a set screw 19. The bearing frame, therefore, encloses and holds the supports for the brushes. The two brushes project into the interior of the cylindrical part 2 of the frame 1 sufficiently to make contact with the lateral face of the armature commutator 20, as shown in Figure 2.

The commutator 20 is of the disc type and comprises a plurality of radially arranged commutator bars 37 held together and gripped by a body portion 21 made of bakelite. In order to reduce the length of the commutator as much as possible, the supporting lug 38 on each commutator bar is located at one side of the axis of the bar as shown in Figures 1 and 2. Figure 2 shows the manner in which the brushes engage the lateral face of the commutator.

The field structure 4 may comprise a laminated core 22, the punchings of which are so shaped that when they are assembled the core has the configuration shown in the drawing; that is, the interior surface of the core will be provided with bosses 23 containing the bolt holes 24 through which pass the bolts 25 for holding the field structure in place. Pole pieces 26 are also formed on the inner surface of the core 22 and around these pole pieces are positioned the field coils 27. A recess 28 is formed in the outside surface of the core 2 opposite each pole piece to receive a cord or other flexible member 29 that serves to hold the field coil in place. The field structure constitutes a unit in itself which is centered by the lugs 12 and held in place by the bolts 25. The cover 9 may be provided with one or more bayonet slots 30, each of which cooperates with a pin 31 on the frame 1 to lock the cover in place.

Figure 1 shows the parts of the motor assembled and applied to the frame of a sewing machine. It will be understood, however, that the sewing machine is shown only for exemplary purposes, as the motor may be applied in a similar manner to the frame of numerous other machines. The cylindrical part 2 of the motor frame 1 fits into a corresponding recess 32 of the sewing machine frame, and the rear portion 3 of the motor frame projects into the interior of the sewing machine frame. The rear part 3 of the motor frame may be screwed to the rear part of the sewing machine frame by one or more screws 33. A worm 34 is secured to the armature shaft 6 at a point between the two bearing bushings 13. This worm meshes with a worm wheel 35 mounted upon the driving shaft 36 of the sewing machine.

It will now be seen that a motor constructed as above described is very simple and compact in construction. It is particularly adapted for use in driving machines where it is important that the motor should project but a small distance from the frame of the machine.

The feature of journaling only the inner end of the armature lessens the overhang of the motor. This result is also furthered by the use of the disc commutator of minimum length, and by housing the brushes in the bearing frame so that the housings for the brushes are in substantially the same vertical plane as the housing for the inner armature bearing.

The motor is completely enclosed and may be so constructed that its external lines will be in pleasing symmetry with the lines of the driven machine.

One form of the motor has been specifically described herein for illustrative purposes only and the motor may take various other forms without departing from the scope of the invention as defined in the accompanying claims.

What I claim is:—

1. An electric motor for use with a machine having a frame with an opening therein, comprising in combination a bearing and supporting member for projecting into the opening into the machine frame and to be supported by the frame, a pair of bearings carried by said member, an armature shaft completely supported near one end in said bearings, an armature mounted on said shaft, and a field carried by said member.

2. The combination with a driven machine having a frame with an opening therein, of a support for mounting on said frame having a bearing within the opening therein, a motor armature journaled only on one side in said bearing, a motor field carried by said support, and a commutator and brushes positioned between said armature and bearing.

3. An electric motor comprising a frame, an armature rotatably journaled therein, a field structure adapted to be applied to and supported by said frame, means for securing the field structure to the frame and means to center the field structure with respect to the frame and armature as it is applied to the frame.

4. An electric motor comprising a frame, an armature rotatably journaled therein, a field structure adapted to be applied to said frame, means for securing the field structure to the frame and means to insure that the field structure assumes a position in coaxial relation with the armature when the field structure is applied to the frame.

5. An electric motor comprising a frame, a field unit adapted to be supported by and adjacent to said frame, means for securing the field structure to the frame and a projection on said frame for centering the field unit with respect to said frame.

6. The combination with the frame of a driven machine of a motor supporting frame attached thereto and supported thereby, a field structure associated with the motor frame, an armature carried by the motor frame and having only its end which is adjacent the driven machine journaled in the motor frame, a disc commutator at that end of the armature which is adjacent the frame of the driven machine, and brushes having holders embedded in the material of which the frame is made at points adjacent to the face of the commutator.

7. The combination with a machine having a shaft to be driven, of a motor having an armature shaft arranged at an angle to the driven shaft, a supporting frame adapted to be telescopically applied to the machine and having a pair of bearings within the machine, driving means arranged between the bearings and interconnecting the driven and armature shafts, an armature carried by the armature shaft and supported only by the bearings in said frame, and a field structure supported by said frame.

8. The combination with a machine to be driven of an electric motor comprising a supporting frame, a portion of which telescopes into the machine to be driven, a bearing associated with the telescoping portion of the frame, an armature journaled only in said bearing, a field structure associated with said frame, and driving means associated with the inner portion of the armature.

9. The combination with a machine having a shaft to be driven, of a motor composed of a plurality of separable and complete units comprising a supporting frame unit adapted to be telescopically applied to the machine, and having a bearing within the machine, an armature unit supported wholly by said bearing, and a field unit supported by said frame unit.

10. The combination with a machine having a shaft to be driven, of a motor composed of a plurality of separable and complete units comprising a supporting frame unit adapted to be telescopically applied to the machine, and having a bearing within the machine, an armature unit supported wholly by said bearing, a field unit supported by said frame and a casing supported by said frame for covering the field and armature units.

11. An electric motor comprising a frame having an annular portion to which a field unit may be attached and a bearing portion at one side of said annular portion, an armature journaled only in said bearing portion, and an annular field unit adapted to be applied to said annular portion of the frame.

12. An electric motor comprising a frame having a lateral projection adapted to telescope into the frame of the machine to be driven, a field structure associated with the frame at one side thereof, an armature having a shaft which is journaled only in said projection, and driving means associated with the armature shaft.

13. An electric motor having a support with an opening therein and a substantially flat face, an armature carried by the support and journalled at one end only, a field frame secured to the support and against the flat face thereof, and a field winding carried by the frame and extending into the opening of the support.

14. An electric motor comprising a supporting frame, an armature carried by the frame and having a shaft journaled at one end only in the frame, a field structure constituting a separate and complete unit attachable to the frame, a commutator carried by the shaft and located between the armature and frame, commutator brushes located in openings in the frame, and a removable casing attached to and supported by the frame and enclosing the field structure, armature and commutator.

15. An electric motor comprising a housing, a field structure supported by the housing, an armature having a shaft journaled at one end only in the housing, a commutator positioned between the armature and the bearing, commutator brushes, and tubular brush supports insulated from and imbedded in the material of which the housing is made.

16. The combination with the frame of a driven machine, of a motor supporting frame attached thereto and supported thereby, a field structure supported by the motor frame, an armature carried by the motor frame and having only its end which is adjacent the driven machine journaled in the motor frame, a commutator at that end of the armature which is adjacent the frame of the driven machine, and commutator brushes having holders imbedded in the material of which the motor frame is made.

In witness whereof I have hereunto subscribed my name.

GUSTAVE C. MARX.